INVENTOR.
RUDOLF FAHRBACH
BY Rauber & Lazer
HIS ATTORNEYS

INVENTOR.
RUDOLF FAHRBACH
BY Rauber & Lazar
HIS ATTORNEYS

United States Patent Office 3,448,935
Patented June 10, 1969

3,448,935
WINDING MACHINE CONTROL DEVICE
Rudolf Fahrbach, Union, N.J., assignor to Universal Manufacturing Company, Inc., Irvington, N.J., a corporation of New Jersey
Filed Jan. 12, 1967, Ser. No. 608,788
Int. Cl. G01b 5/04
U.S. Cl. 242—4    5 Claims

ABSTRACT OF THE DISCLOSURE

A winding machine is provided with an indexing mechanism which moves a toroidal core workholder in opposite directions to cause the coils being wound to fall into level layers of selectable lengths. The lengths of the layers are determined by a pair of concentric discs cooperating with each other through latch means to move associated switch operators to reverse the direction of the workholder drive in accordance with the selected relative positions of said discs.

BACKGROUND OF THE INVENTION

*Field of the invention.*—This invention relates to a winding and reeling apparatus and is directed more particularly to the winding of toroidal coils and similar devices.

*Prior art.*—In coil winding machines, oscillating means are provided for providing sector windings wherein a number of turns of strand wound in one direction is different from the number of turns in the opposite direction. For example, a sector winding on an arcuate portion of a toroidal core is formed by winding, in reciprocating or oscillating sequence, twenty turns clockwise and ten turns counterclockwise on the core for progressively developing thereby the desired number of turns. The windings are arranged in stepped-relation and are termed progressive windings. Such windings are useful in the electrical art to achieve low distributed capacitance in the inductor thus formed.

Machines are known for achieving such windings but are complex and inflexible for adjustment or selection for windings of different forms and dimensions. Some of the prior art machines are based on electro-mechanical principles, wherein turns are counted by photo-cells or micro-switch devices as they are wound on the core and are recorded on a counter. On a set or predetermined number of turns, the counter responds by producing an output signal which energizes a switch relay or the like to cause the reverse-winding action to occur. The pre-set number of turns is, therefore, counted to the turns needed in the reverse direction. When the desired reverse-counter number has been reached the counter will produce a signal which will then repeat the sequence. Not only are such devices expensive and complex, but they have been found also to be difficult to be used with toroidal winding machines and are not easily adapted for accurate synchronized operation with the core-support devices used on winding machines.

SUMMARY AND OBJECT OF THE INVENTION

It is an object of this invention to provide an improved progressive winding apparatus having mechanical components exclusively to accurately wind strand on a core to form sector windings in stepped-form.

It is a further object of the invention to provide a progressive winding apparatus having means for effecting accurate synchronization with the core support.

According to the invention, a shaft is rotated through an arc proportional in length and rate of rotation to the portion of a core on which a desired number of turns are being wound. A pair of index arms are respectively rotated by the shaft and are arranged to actuate an electrical switch in sequence corresponding respectively to the end of each winding range to energize appropriate controls to reverse the drive of the core support mechanism. The position of each index arm on the shaft corresponds respectively to the boundary or end of each layer of the progressive winding. The index arms are slidable relative to each other and to the shaft but are restrained from relative movement by a spring which, however, allows one of the index arms to slide a given arcuate length calibrated accurately to correspond to the difference in length between the forward-sector and reverse-sector windings. One index arm is kept in a fixed position allowing the other index arm and the shaft to rotate the calibrated distance. A cammed trigger releases the restrained index arm after the shaft has rotated the precise distance or arc-length allowing the pairs of index arms to be rotated in fixed-distance unison but displaced from the original starting position by the arc length between the forward and reverse winding sector. The index arms rotate in unison to the end of the forward or longer-sector winding whereat the other index arm actuates the electrical switch to reverse again the core support mechanism.

With this novel construction, the winding mechanism is accurately controlled to effect a desired progressive winding on a core of ring or bar form.

Other and further objects and features of this invention will appear from the following description and in the accompanying drawing to which reference is made in the detail description of one embodiment of the invention and in which like reference characters indicate identical parts in the various use.

DESCRIPTION OF THE PREFERRED EMBODIMENTS

Figure 1:
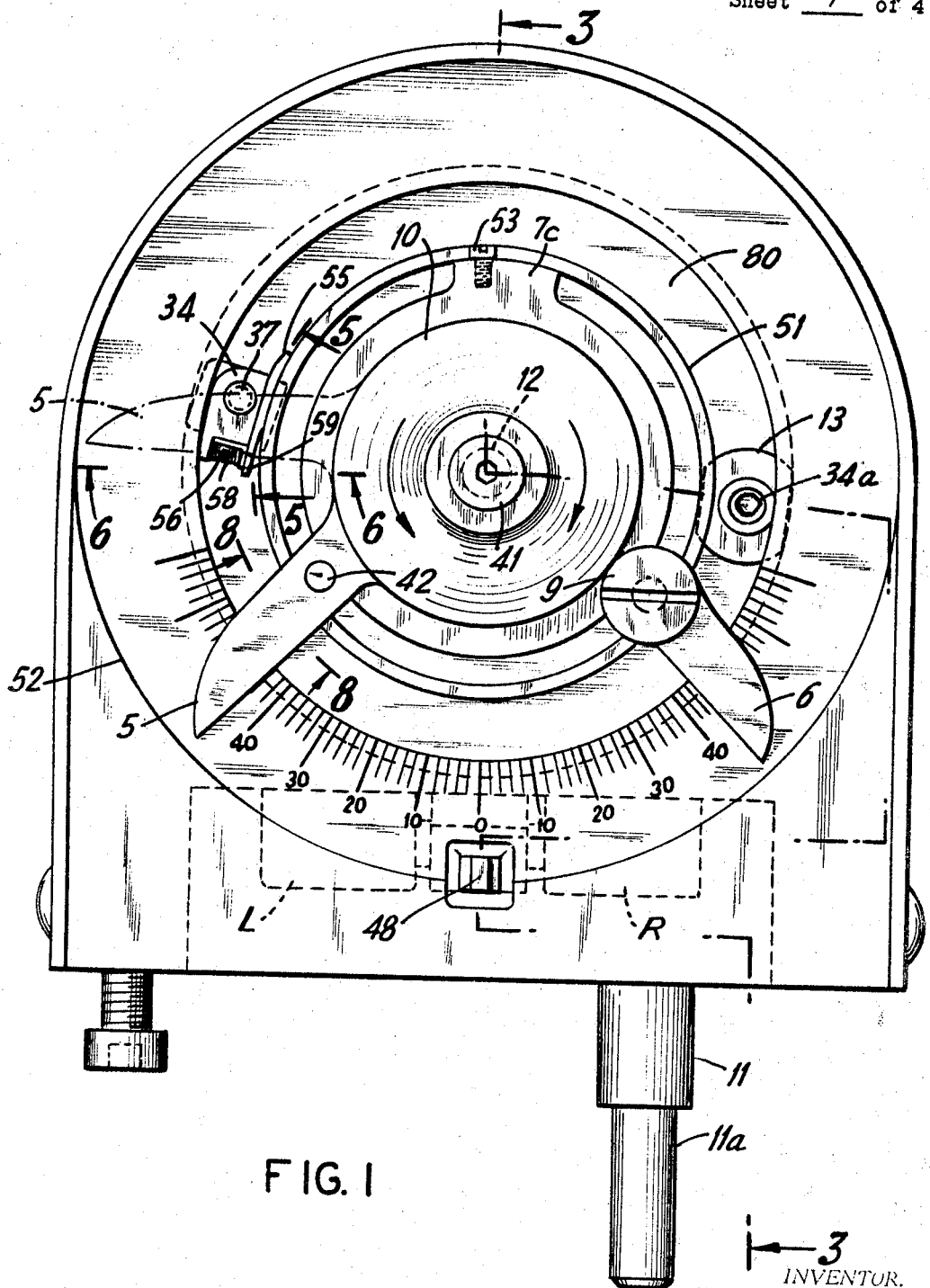
FIG. 1 is an end elevation view of the attachment useful with winding machines showing certain of the hidden main parts by dashed lines.

Referring now to the drawing, FIG. 1 is the housing containing the components of the attachment of the invention. The front face of the housing includes a circular dial 52 provided with degree inscriptions arranged with a semi-circular limit of 180° (not shown) each, starting from the zero-degree reference at the bottom as seen in FIG. 1. A pair of index arms 5 and 6 are arranged for rotation about the center of the dial 52 and are provided with straight radial portions extending over the dial for indicating their relative position. The attachment is arranged to be mounted on or near a machine for which it is to provide the control function according to the invention.

The embodiment being described utilizes a shaft 11 as its input motive power. The free end 11a of shaft 11 is coupled to a drive shaft of the machine under control of the invention by suitable flexible connectors or gear trains of suitable type well known to those skilled in this art.

A suitable machine with which this attachment is used, may be for example a toroidal coil winding machine utilizing a roller table for supporting the core upon which windings are to be formed. Such a machine is disclosed in my Patent No. 3,383,059. For the type of machines utilizing a core clamp or holder which is driven by motor means under control of reciprocating sector drives, this attachment is also easily connectable thereto. Such a machine is disclosed in my copending application Ser. No. 503,651, filed on Oct. 23, 1965, entitled "Toroidal Coil Winding Machine."

Figure 3:
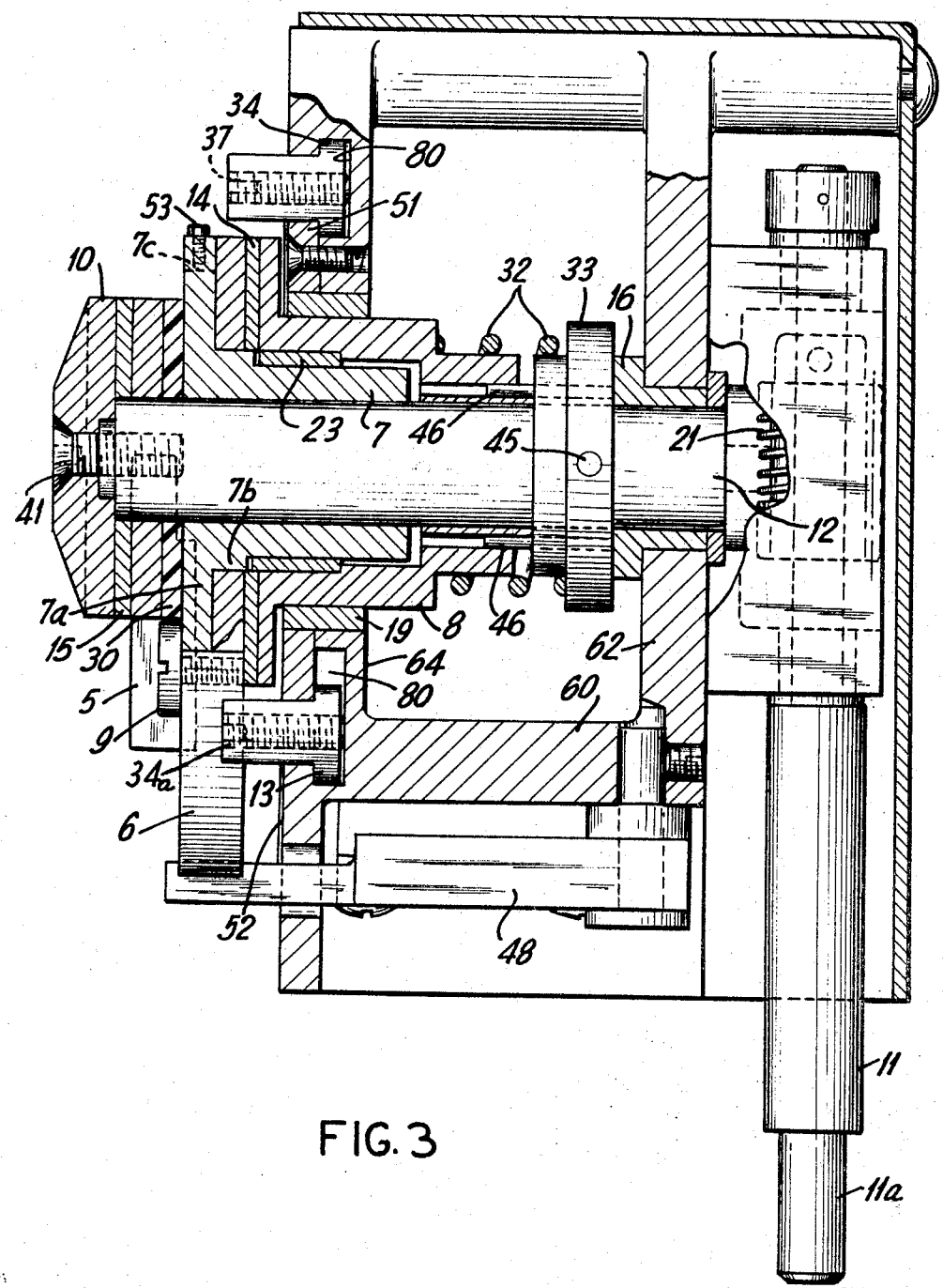
FIG. 3 is a sectional view, in part, of the attachment as taken along line 3—3 of FIG. 1.

Shaft 11 is coupled to drive a shaft 12 through the gear system comprising worm 21 extending from shaft 11 and engaging a worm gear 20 attached to the end of shaft 12, shown at the right of FIG. 3. At the other end of shaft 12 (left end of FIG. 3), the index arm 5 is mounted but subject to rotational friction restraint by a friction disc 15 and a washer 10 mounted about shaft 12. The opposite or outer face of washer 10 is attached to the shaft by a screw 41.

Index arm 5 is integrally formed on a peripheral portion of a flat ring having an aperture of a diameter slightly greater than the diameter of shaft 12. A portion of arm 5 is provided with a pin 42 extending inwardly as seen from the front view of FIG. 1. A collar 33 is rigidly connected to and about shaft 12 by a set screw 45, the collar 33 serving as an end wall or retainer for a compression spring 32. The other end of the compression spring 32 presses against a friction sleeve 8 of generally cylindrical form having a shoulder for retaining the spring 32, and another shoulder for receiving other components to be described. A pair of holes in the right end face of the sleeve 8 are adapted to receive the respective ends of a pair of dowel pins 46 which in turn extend into similar holes in the collar 33, as shown in FIG. 3. The dowel pins serve to transmit rotational torque from the collar 33 to the sleeve 8 upon rotation of the shaft 12 and yet allow by telescoping action for axial relative displacement of the sleeve 8 with respect to the collar 33.

The shaft 12 is carried within the inner frame 60 by its end wall 62 provided with an aperture for carrying the right end of shaft 12 within a bushing 16. The left wall 64 of the frame 60 carries the other end of shaft 12 on a bushing 19, the inner surface of which rides on the outer surface of sleeve 8. A portion of the inner surface of sleeve 8 is provided with a bronze bushing 23 the inner surface of which rides on an outer surface of sleeve 7 which in turn freely rotates on shaft 12. Flange 51 is secured to the end wall 64 by three screws arranged so that its outer surface is substantially even with the outer surface of dial 52. A T-slot 80 is formed and is thus defined by the inner edge of the dial 52, the outer edge of flange 51 and a portion of the housing wall 64. The T-slot serves to receive a pair of sliding nuts 13 and 34 positionable and retained in any selected position by set screws 34a and 37 respectively.

Sleeve 7 freely rotates about shaft 12 and is provided with a flange portion 7a and a shoulder portion 7b. The flange 7a is provided further with an extension portion 7c carrying a set (cylinder head) screw 53 (FIG. 1). The ring portion of the index arm 6 has an inner diameter such as to rotate about the shoulder portion 7b of sleeve 7. The index arm 6 is off-set from the plane of the ring to engage the right end (FIG. 1) of the extension portion 7c of sleeve 7. The slot screw 9 is received in a tapped hole in the extension portion of the index arm 6 and serves to clamp arm 6 to sleeve 7 when tightened. The screw 9 has an extension head to effect also clamping action by pressing when tightened against the outer surface of the sleeve 7 so that the sleeve 7 can be thereby fixedly rotated with the index arm 6.

A friction disc 14 is placed between the shoulder portion 7b on the surface of the index arm 6 and the end face of sleeve 8.

Figure 9:
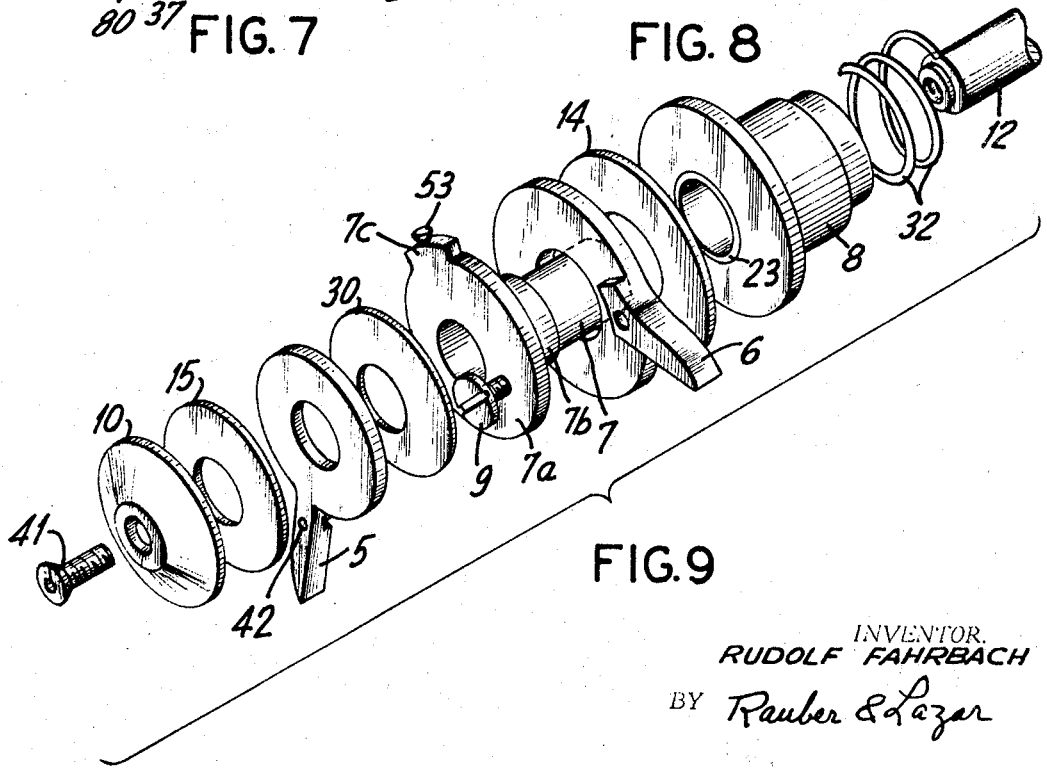
FIG. 9 is an exploded isometric view of the principal elements of the apparatus.

The index arm 6, it is noted, is a component of a sub-assembly that coacts to perform a function essential to the operation of the apparatus, as will be described. The sub-assembly consists of the index arm 6 including its ring portion, the feed limiter sleeve 7, friction sleeve 8, bronze bearing 23, friction disc 14 and slot screw 9, all of which have been described. Another sub-assembly related to the index arm 5 consists of, in addition, the friction washer 10 and the pin 42 on the arm 5. See FIG. 9 for an exploded view of these parts.

Between the sub-assemblies of the arms 6 and 5 respectively, there is provided a relatively frictionless washer 30, preferably made of Teflon material or the like, to provide a substantially frictionless surface on either face of the washer whereby the sub-assemblies are relatively rotated about shaft 12 independent of each other, except as will be explained.

Figure 2:
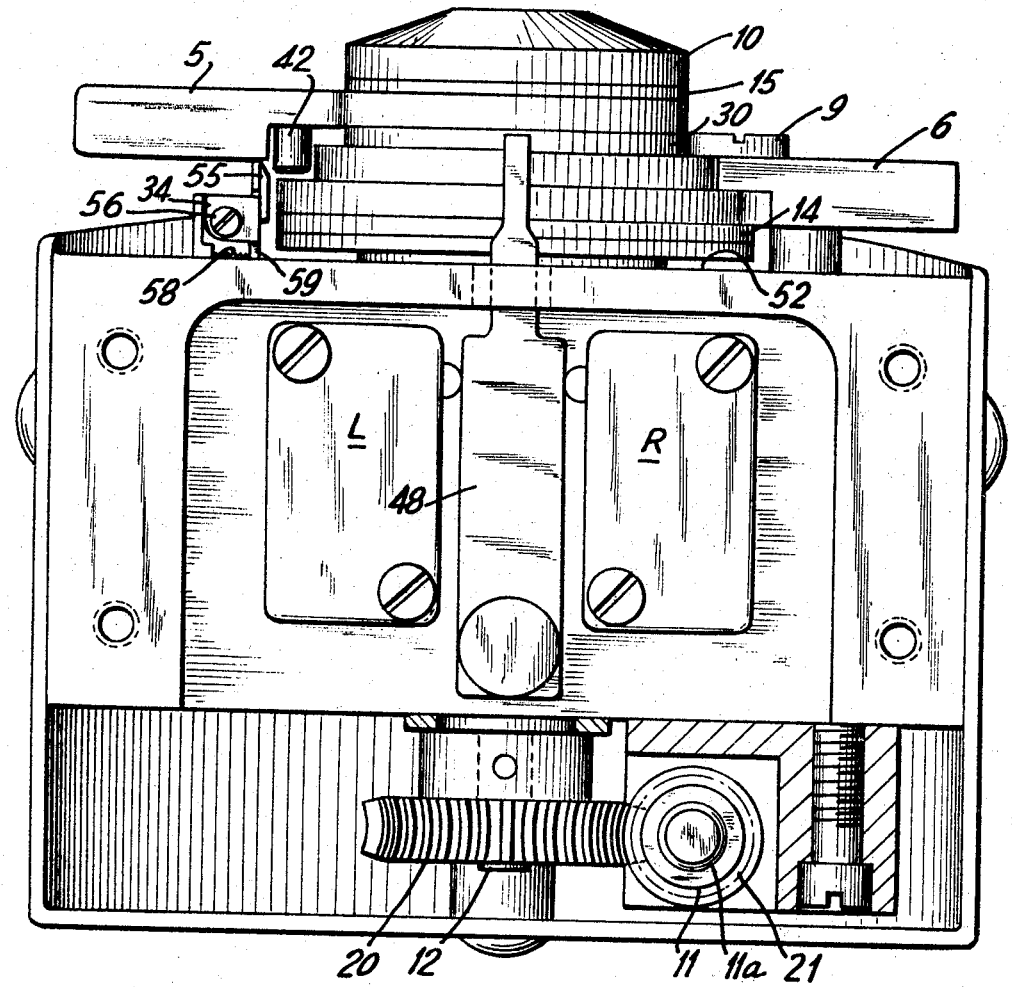
FIG. 2 is a bottom view of the attachment shown in FIG. 1.

The straight radial portions of the arms 5 and 6 are adapted upon rotation towards the zero index of ring 52 to engage an actuator arm 48 (FIGS. 1–3) which in turn is adapted to operate upon left and right motion, as seen in FIG. 2, a microswitch L and R, respectively. The microswitches L and R provide an electrical circuit to the motor of the machine (not shown) under control of this apparatus for forward and reverse operation. The details of the electrical connections are not shown but are well understood by those skilled in this art.

Figure 5:
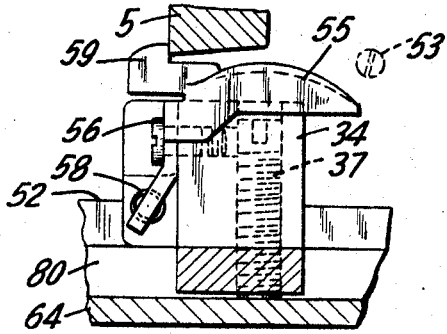
FIG. 5 is an enlarged fragmentary view as seen along line 5—5 of FIG. 1, showing the trigger mechanism 55 just preceding engagement with camming screw 53.
Figure 6:
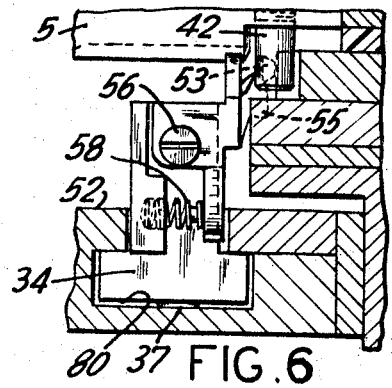
FIG. 6 is an enlarged fragmentary view of the trigger 55 as seen along line 6—6 of FIG. 1.
Figure 7:
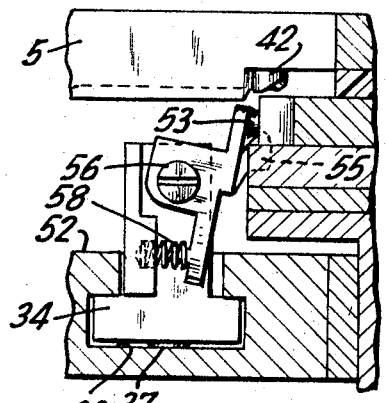
FIG. 7 is the view of FIG. 6 showing the screw 53 in engagement with cam 55.

The T-nut 34 as described above is carried in the T-slot 80 and its selected position is fixed by screw 37. The T-nut 34 carries a trigger 55 pivotally attached to the nut 34 by a screw 56 and is resiliently pivoted outwardly by a spring 58. (See FIGS. 5–7 for enlarged details hereof.) The trigger is provided with a retaining hook portion 59 attached to engage the straight edge of index arm 5 when the spring 58 is expanded but is arranged to disengage the straight edge surface of arm 5 when the spring 58 is compressed. Trigger 55 is provided with a warped or cam surface which is so shaped as to effect this disengaging action positively. The cam surface carries the stud 53 on sleeve 7 as sleeve 7 is rotated counter clockwise and by coaction of stud 53 and the cam surface, trigger 55 is pivoted inwardly about screw 56 compressing spring 58 as shown in FIG. 7. The inward movement is spatially critically related to the off-set (stepped) portion of arm 6 to disengage hook 59 therefrom as stud 53 rides the cam surface.

The apparatus just described provides a means for the progressive winding of a strand on a core of either circular (toriodal) or linear form. Progressive winding generally involves winding a large number of turns on a core in a forward (or clockwise) direction, and applying a lesser number of turns in the reverse (or counterclockwise) direction over the first layer. Thereafter, progessively or sequentially additional layers are wound upon the first layer, resulting in a staggered-spread of windings.

Figure 4:
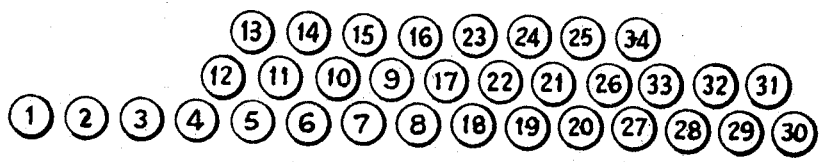
FIG. 4 is a schematic of the contiguous and adjacent wires in section showing the pile-up of a progressive winding numbered in the sequence wound.

FIG. 4 illustrates schematically the arrangement of the turns of strand forming the progressive winding. Such a winding is controlled by the apparatus of this invention by regulating the speed of the transmission of the winding machine under control of the apparatus. Accordingly as the speed of the winding machine transmission is increased, fewer turns will be wound in each sector, and conversely, reduced speed will increase the turns wound in each sector. FIG. 4, illustrates, eight turns in the forward sector and four turns in the reversed sector.

Generally, winding machines are provided with uniform sector windings wherein a sector is swept within fixed limits. The apparatus of this invention provides a means to modify the fixed sector scanning in order to accomplish the winding desired, by progessively advancing the start position for each sector to be wound. Thus, for example, each new start position is advanced 30° clockwise from the previous start position.

In the operation of the apparatus it will be understood that in the description that follows the rotation of the shaft 12 is in respect of it as seen in FIG. 1. Clockwise (cw.) motion of the index arm 6 corresponds to a reverse or short stroke motion or sector sweeping for producing the winding on a core and is thus representative of the phase producing the smaller number of turns. Similarly, counterclockwise (ccw.) motion of index arm 5 corresponds to the forward direction of winding, producing the larger number of turns of each progressive winding phase.

The apparatus is set up by first calibrating it for the desired sector portions that are to be covered by the winding turns. The initial point for starting the windings on the core is calibrated with reference to the dial 52 by manually rotating index arm 5 to the reference on dial 52 corresponding to the starting position on the core. For illustrative purposes it shall be assumed that the starting position on the toroidal core corresponds to the left 120° mark (not shown) on dial 52. The index arm 6 is then manually rotated in a cw. direction to a position just in contact with the microswitch actuator arm 48 in its neutral position. The adjusting screw 9 is loosened to allow relative movement of the sleeve 7 free from the index arm 6 so that the extension portion 7c of sleeve 7 can be manually rotated to engage pin 42 extending from the inner face of index arm 5. Adjustment screw 9 is then tightened to fixedly clamp index arm 6 to the sleeve 7 so that these two elements will rotate as a unitary assembly. The limit of the range of movement of index arm 6 is then set by positioning T-nut 13 within T-slot 80 so that the straight radial portion of index arm 6 is in line with the number of degrees on the right semi-circle of dial ring 52, which corresponds to the limit of the first layer of the progressive winding. With the T-nut 13 fixed in position by screw 37 tightened, arm 6 is then manually rotated against the friction of the parts being pressed against it by the expansion of compression spring 42 until the arm 6 just touches T-nut 13. It will be understood that as arm 6 is rotated to the T-nut 13 position that arm 5 is carried with arm 6 in fixed spatial separation by pin 42 engaging portion 7c of sleeve 7, which in turn is fixedly rotated with arm 6 for ccw. rotation. As arm 6 is held in position by T-nut 13, pin 42 and portion 7c become separated since the friction effect of washer 15 is greater than the friction effect of washer 30.

The T-nut 34 functions to absorb the overlap that is necessary for the apparatus to be driven for the longer stroke needed for the larger number of turns. Thus, if the forward stroke is a 120° sweep, and the reverse stroke is a 90° sweep, the overlap for the forward stroke is 30°. It will be understood, of course, that within this 120° sweep any number of turns may be wound depending on the transmission speed described above. Accordingly, the number of turns produced by each sweep is a matter of choice.

The T-nut 34 must be located in the slot 80 within a certain arc length within the range of the short winding sector determined in the first instance by the arc distance between the two index arms 5 and 6. More particularly, T-nut 34 must be, for the example being described, in a position between zero and 90° as indicated on the left semi-circle of dial 52, and this position must be less than the arcuate distance index arm 6 traverses (here 90°) and more than the difference in the arcuate movement of the two arms (here 30°). Furthermore, it will be understood that the T-nut 34 can be located in any position within T-slot 80 within the restricting ranges just described. After the index arms have been calibrated, as just described, and the core has been positioned on the machine ready for winding strand from the supply spool, the apparatus is placed in operation.

Figure 8:
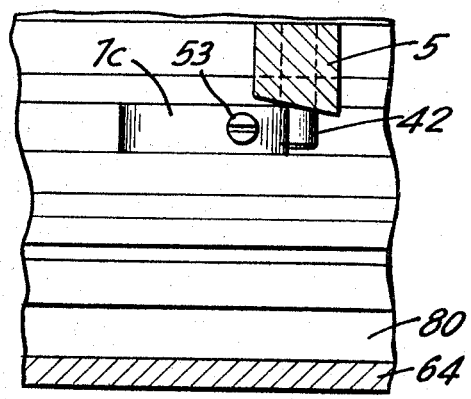
FIG. 8 shows the view on FIG. 1 along line 8—8 with the apparatus in the position wherein pin 42 engages extension portion 7c.

Assume, to start, a ccw. rotation (FIG. 1) of shaft 12 from the calibrated position wherein index arm 6 is just touching the switch arm 48 in its neutral position. Operative rotation of shaft 12, ccw., effects concurrent rotation of index arms 5 and 6 since the force of spring 32 is sufficient to rotate index arm 6, sleeve 7, fixed by screw 9 thereto, and, by the engagement of extension 7c with pin 42 on arm 5, arm 5 is also rotated ccw. Frictionless washer 30, has no effect, it is to be noted, since arm 5 is directly driven by arm 6. As index arm 5 is thusly progressively rotated toward switch arm 48, index arm 6 is rotated toward T-nut 13. The arcuate distance between the arms 5 and 6 during this phase of the operation corresponds to the length of the sector on the core for the short or reverse stroke of the progressive winding phase. Since ccw. rotation of shaft 12 must result in the larger number of turns, it will be appreciated that if the arms 5 and 6 were to continue to rotate with the short arcuate spacing, arm 5 would strike prematurely the actuator arm 48 to cause a reversal signal to the winding machine motor before the longer sector stroke required had been completed. I provide, therefore, during some portion of this ccw. motion that arm 5 engage the hook 59 of trigger 55, the position during ccw. rotation at which such engagement occurs depending on the location of T-nut 34, above described. The force of restraint effected by trigger 55 acting on arm 5 is greater than the frictional forces produced by the compression spring 32 so that arm 5 slips over washer 30 allowing arm 6 to continue rotating with shaft 12. As shaft 12 continues to rotate in the ccw. direction, but arm 5 in a non-moving position, the set screw 53 carried on the extension 7c of sleeve 7 approaches trigger 55. Continued rotation causes the screw 53 on the extension portion 7c of sleeve 7 to engage the cam surface of trigger 55 and ride on it so as to depress spring 58 and pivot the trigger 55 to disengage and thereby free the index arm 5. The relative position of pin 42 and screw 53 is such that the release of trigger 55 from arm 5 is substantially simultaneous with the engagement of pin 42 with arm 5. See FIGS. 6, 7 and 8 for enlarged details of the relative positions of these components during this phase of the operation. Thereafter, arm 5 is carried ccw. with arm 6 until the end of the sector cycle. The position at which arm 5 becomes disengaged corresponds to the end of the arcuate distance of the difference of the two winding phases, viz. 30°. Note that the index arm 5 on being released is allowed to be carried in the ccw. direction with index arm 6 by the friction force of friction washer 15 on the mating face of index arm 5. The calibration provided for the angular spacing between arm 6 and arm 5 is the arcuate distance corresponding to the larger number of forward windings or turns. As the end of the sector sweep is approached, arm 5 nears the actuator arm 48. When it engages the arm 48, switch R is actuated whereby the motor of the winding machine (not shown) is reversed to drive thereby the shaft 12 in the opposite, i.e., cw. direction. The cw. rotation of shaft 12 rotates index arm 6 cw. toward the actuator arm 48. Arm 5 is also being rotated cw. and will override the trigger 55. When arm 6 strikes actuator arm 48, which in turn actuates switch L, the motor of the winding machine is again reversed to start the winding phase in the longer or ccw. phase.

The apparatus again is operated as described above. The arm is restrained by trigger 55 (FIG. 5) from following index arm 6 for the required lost motion to provide for the longer winding sector, as described above. Note that when arm 6 strikes the T-nut 13, arm 6 will remain fixed without any effect on arm 5 since the friction force of washer 14 is greater than the force of washer 30 so that arm 5 continues its functions independent of the arm 6 assembly until the cycle is again reversed to the ccw. phase.

The control apparatus just described is useful to control winding machines for either toroidal or bar cores. In the preferred form the circular rotating index arms are driven from a rotating shaft input, which, as will be apparent to those skilled in the art, can be taken from either rotational or linearly—reciprocating drives.

The reversing-switch output of this control can be utilized in any known manner to control the operation of direction of drive of the winding machine.

I claim:
1. A control apparatus for a winding machine comprising in combination:
   (a) a first index means responsive to movement in one direction for limiting the movement to a given distance in said one direction; and
   (b) a second index means responsive to movement in the direction opposite to said one direction for limiting the movement to a given distance in said opposite direction
   said first index means (a) comprising:
      (a1) a first freely rotatable disc (6), a rotatable shaft (12), said first freely rotatable disc (6) being journalled on said rotatable shaft (12), the roation of said shaft being proportional to said relative movement,
      (a2) a freely rotatable sleeve (7) adjacent said disc (6) and journalled on said shaft, said sleeve having a stud (53), and an adjustable clamp (9) for joining said sleeve to said first disc.
      (a3) a first friction disc (14) journalled for driven rotation on said shaft and means for resiliently pressing said first friction disc (14) against said first freely rotatable disc (6), and
   said second index means (b) comprising:
      (b1) a second freely rotatable disc (5) journalled on said shaft (12) and having an extension (42) for contacting said first disc to rotate said first disc in unison with said second disc in only one direction,
      (b2) a second friction disc (15), journalled for driven rotation on said shaft and means for resiliently pressing against said second disc for frictional rotation of said second disc, and
   (c) a resilient trigger (55) having a catch to restrain said second disc in a non-rotating selected position for rotational movement opposite to said only one direction,
   (d) means responsive to contact of said stud (53), and for releasing said trigger whereby said second disc is free to rotate.

2. Apparatus according to claim 1 including means for manually adjusting the distance of relative movement in either direction.

3. Apparatus according to claim 1 comprising a reversible motor operatively connected to said shaft for rotating said shaft in either of two directions of rotation, and a two-way switch (48) responsive to contact by either said first or said second index means for energizing said motor.

4. A control apparatus comprising, in combination:
   (a) a rotatable shaft (12),
   (b) a first (6) and a second (5) index member journalled for free rotation on said shaft,
   (c) spring-loaded (32) friction means (14, 15) coupled to said shaft for rotating said index members with said shaft;
   (d) a relatively frictionless member (30) between said index members to allow each of said index members to be rotated independently of the other;
   (e) coupling means (7, 9, 42) for rotating said index members in unison in one direction,
   (f) spring-loaded decoupling means (55) for stopping the rotation of one of said index members relative to the other,
   (g) adjustable means (34, 13) for limiting the rotation of each of said index members in one direction of rotation,
   (h) a reversible motor connected to said shaft for rotating said shaft in either direction of rotation; and
   (i) switch means actuated by each of said index members for energizing said reversible motor.

5. An apparatus according to claim 4 wherein said spring-loaded decoupling means comprises:
   (a) a resiliently pivotal cam having a catch portion for stopping the rotation of said one index member, and said coupling means includes
   (b) an actuating portion for pivoting said cam,
   (c) whereby when said cam is pivoted by said actuating portion, said one index member is free to rotate with said shaft.

References Cited
UNITED STATES PATENTS

| | | | |
|---|---|---|---|
| 1,884,409 | 10/1932 | Vienneau | 242—9 |
| 2,422,180 | 6/1947 | Broadbent | 318—267 XR |
| 2,726,817 | 12/1955 | Barrows | 242—4 |
| 2,941,734 | 6/1960 | Clarke | 242—4 |

BILLY S. TAYLOR, *Primary Examiner.*

U.S. Cl. X.R.

74—817; 242—158.4; 318—267